(12) United States Patent
Konijeti

(10) Patent No.: US 12,193,613 B1
(45) Date of Patent: Jan. 14, 2025

(54) CUTTING BOARD AND METHOD OF USE

(71) Applicant: Surya Swaraj Konijeti, West Hollywood, CA (US)

(72) Inventor: Surya Swaraj Konijeti, West Hollywood, CA (US)

(73) Assignee: Surya Swaraj Konijeti, West Hollywood, CA (US)

( * ) Notice: Subject to any disclaimer, the term of this patent is extended or adjusted under 35 U.S.C. 154(b) by 0 days.

(21) Appl. No.: 18/664,058

(22) Filed: May 14, 2024

(51) Int. Cl.
*A47J 47/00* (2006.01)

(52) U.S. Cl.
CPC .................................... *A47J 47/005* (2013.01)

(58) Field of Classification Search
CPC ...................................................... A47J 47/005
See application file for complete search history.

(56) References Cited

U.S. PATENT DOCUMENTS

| | | | | |
|---|---|---|---|---|
| D315,084 S | * | 3/1991 | Sata | D7/698 |
| 5,606,908 A | * | 3/1997 | Mittnight | A47J 47/005 99/485 |
| 5,996,479 A | * | 12/1999 | Mittnight | A47J 47/005 99/485 |
| 7,134,653 B1 | * | 11/2006 | Ladenheim | A47J 47/005 269/302.1 |
| 7,178,798 B1 | * | 2/2007 | Funk | A47J 47/005 269/302.1 |
| D689,350 S | * | 9/2013 | Sudmalis | D7/698 |
| D701,095 S | * | 3/2014 | Arvan | D7/698 |
| 11,304,566 B2 | * | 4/2022 | Fiola | A47J 47/005 |
| 2009/0096150 A1 | * | 4/2009 | Cihan | A47J 47/005 269/289 R |
| 2011/0308361 A1 | * | 12/2011 | Hugo | A47J 47/005 83/13 |
| 2012/0319339 A1 | * | 12/2012 | Young | A47J 47/005 269/15 |
| 2014/0265088 A1 | * | 9/2014 | Arvan | A47J 47/005 269/14 |
| 2015/0257608 A1 | * | 9/2015 | Torlai | A47J 47/005 269/15 |

* cited by examiner

*Primary Examiner* — Seahee Hong
(74) *Attorney, Agent, or Firm* — Procopio, Cory, Hargreaves & Savitch LLP

(57) ABSTRACT

An aspect of present disclosure involves a cutting board that reduces eye irritation and tears during cutting of a vegetable and/or a herb of the allium family comprising a main section including a cutting section configured to receive the vegetable and/or the herb of the allium family to be cut; one or more liquid-receiving sections adjacent to the cutting section, wherein a chemical irritant syn-propanethial-S-oxide produced when cutting the vegetable and/or the herb of the allium family is attracted to more proximate liquid in the one or more liquid-receiving sections instead of more distal eyes of the user, resulting in the cutting board reducing eye irritation and tears during cutting of the vegetable and/or the herb of the allium family.

19 Claims, 6 Drawing Sheets

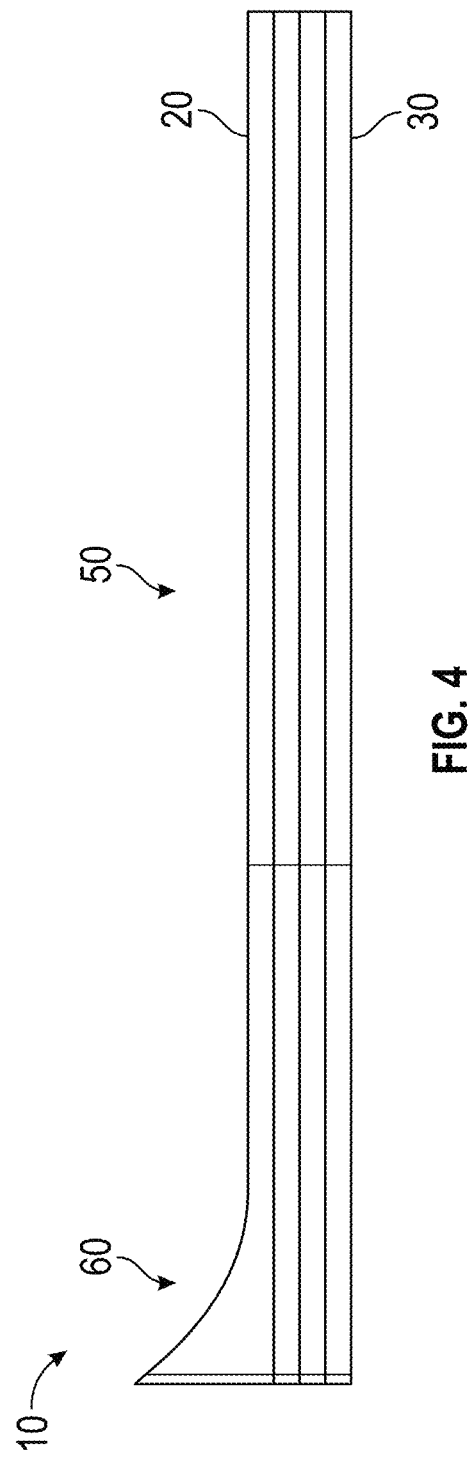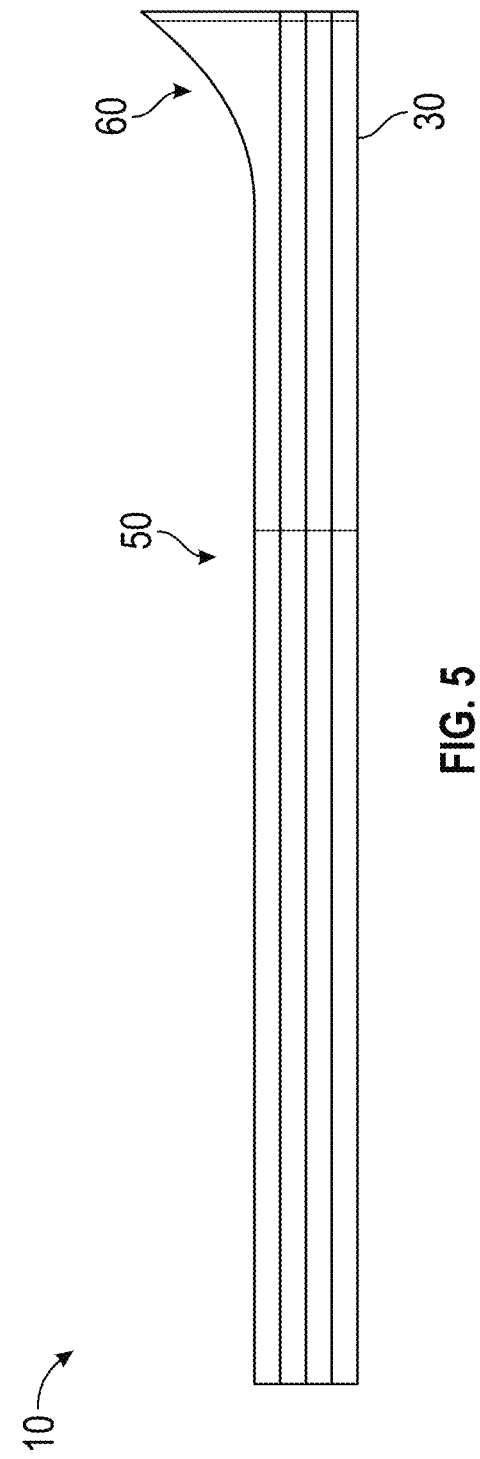

CUTTING BOARD AND METHOD OF USE

FIELD OF THE INVENTION

The present invention generally relates to cutting boards.

BACKGROUND OF THE INVENTION

Alliums are a vegetable/herb family that include onions, garlic, shallots, and chives. When these vegetables/herbs are cut, the enzyme alliinase is released. Alliinase causes a chemical reaction that results in the production of a chemical irritant known as syn-propanethial-S-oxide, which causes eye irritation and tears.

SUMMARY OF THE INVENTION

Implementations of the present disclosure relates to a cutting board for vegetables (e.g., onions) and/or herbs of the allium family that reduces eye irritation and tears during cutting of these types of vegetables/herbs. The cutting board is in the shape of an onion, has a peripheral groove for water, as well as central hatched grooves to hold water (and juice from the cut onion(s)) and better hold the onion(s) in place. These hatched grooves also allow for more uniform slices of onions. A curved onion stalk at the top of the board helps to hold water in place, preventing water from dripping away while cutting, and allows for smoother transfer of cut onions to any dish and to drain the water and other liquids from the cutting board after use. The cutting board may be made of a variety of different materials, such as, but not limited to, bamboo, which is non-toxic, lightweight, inexpensive, sustainable, and has low porosity. The cutting board may be used for cutting other items in addition to vegetables/herbs.

An aspect of present disclosure involves a cutting board that reduces eye irritation and tears during cutting of a vegetable and/or a herb of the allium family comprising a main section including a cutting section configured to receive the vegetable and/or the herb of the allium family to be cut; one or more liquid-receiving sections adjacent to the cutting section, wherein a chemical irritant syn-propanethial-S-oxide produced when cutting the vegetable and/or the herb of the allium family is attracted to more proximate liquid in the one or more liquid-receiving sections instead of more distal eyes of the user, resulting in the cutting board reducing eye irritation and tears during cutting of the vegetable and/or the herb of the allium family.

One or more implementations of the above aspect of the disclosure include one or more of the following: the cutting board has a shape of a body of an onion in a top plan view; the cutting section is a central cutting section and the one or more liquid-receiving sections include a liquid-receiving groove adjacent to the central cutting section; the one or more liquid-receiving sections include central hatched grooves in the central cutting section; the central cutting section includes a perimeter and the liquid-receiving groove is a peripheral groove adjacent to the perimeter of the central cutting section; the cutting board includes a top section with the one or more liquid-receiving sections; the top section is angled upwardly from the main section; the top section includes split sections; and/or the cutting board is made of bamboo.

Another aspect of present disclosure involves a method of using a cutting board that reduces eye irritation and tears during cutting of a vegetable and/or a herb of the allium family, the cutting board comprising a main section including a cutting section configured to receive the vegetable and/or the herb of the allium family to be cut; one or more liquid-receiving sections adjacent to the cutting section, wherein a chemical irritant syn-propanethial-S-oxide produced when cutting the vegetable and/or the herb of the allium family is attracted to more proximate liquid in the one or more liquid-receiving sections instead of more distal eyes of the user, resulting in the cutting board reducing eye irritation and tears during cutting of the vegetable and/or the herb of the allium family; the method comprising adding water to the one or more liquid-receiving sections of the cutting board adjacent to the vegetable and/or the herb of the allium family to be cut; cutting the vegetable and/or the herb of the allium on the cutting section of the cutting board; producing a chemical irritant syn-propanethial-S-oxide by the vegetable and/or the herb of the allium during cutting; attracting the chemical irritant syn-propanethial-S-oxide to the more proximate liquid in the one or more liquid-receiving sections instead of more distal eyes of the user, resulting in the cutting board reducing eye irritation and tears during cutting of the vegetable and/or the herb of the allium family.

One or more implementations of the aspect of the disclosure described immediately above include one or more of the following: the cutting section is a central cutting section and the one or more liquid-receiving sections include a liquid-receiving groove adjacent to the central cutting section, and adding water includes adding water to the liquid-receiving groove; the central cutting section includes central hatched grooves and cutting includes cutting on the central cutting section over the central hatched grooves; communicating water between the liquid-receiving groove and the central hatched grooves; and/or the central cutting section includes a perimeter, the liquid-receiving groove is a peripheral groove adjacent to the perimeter of the central cutting section, and adding water includes adding water to the peripheral groove.

BRIEF DESCRIPTION OF THE DRAWINGS

In order to describe the manner in which the present disclosure can be implemented, a more particular description will be rendered by reference to specific implementations thereof which are illustrated in the appended drawings. For better understanding, the like elements have been designated by like reference numbers throughout the various accompanying figures. Understanding that these drawings depict only typical implementations of the invention and are not therefore to be considered to be limiting of its scope, the invention will be described and explained with additional specificity and detail through the use of the accompanying drawings in which:

FIG. 4 illustrates a left side elevational view of the cutting board of FIG. 1.

FIG. 5 illustrates a right side elevational view of the cutting board of FIG. 1.

DETAILED DESCRIPTION OF PREFERRED EMBODIMENTS

In this disclosure, as illustrated in FIGS. 1-8, specific terminology is employed for the sake of clarity. The invention as claimed in this application, however, is not intended to be limited to specific terminology so selected, and it is to be understood that each specific element includes all technical equivalents that operate in a similar manner to accomplish similar functions.

Figure 1:
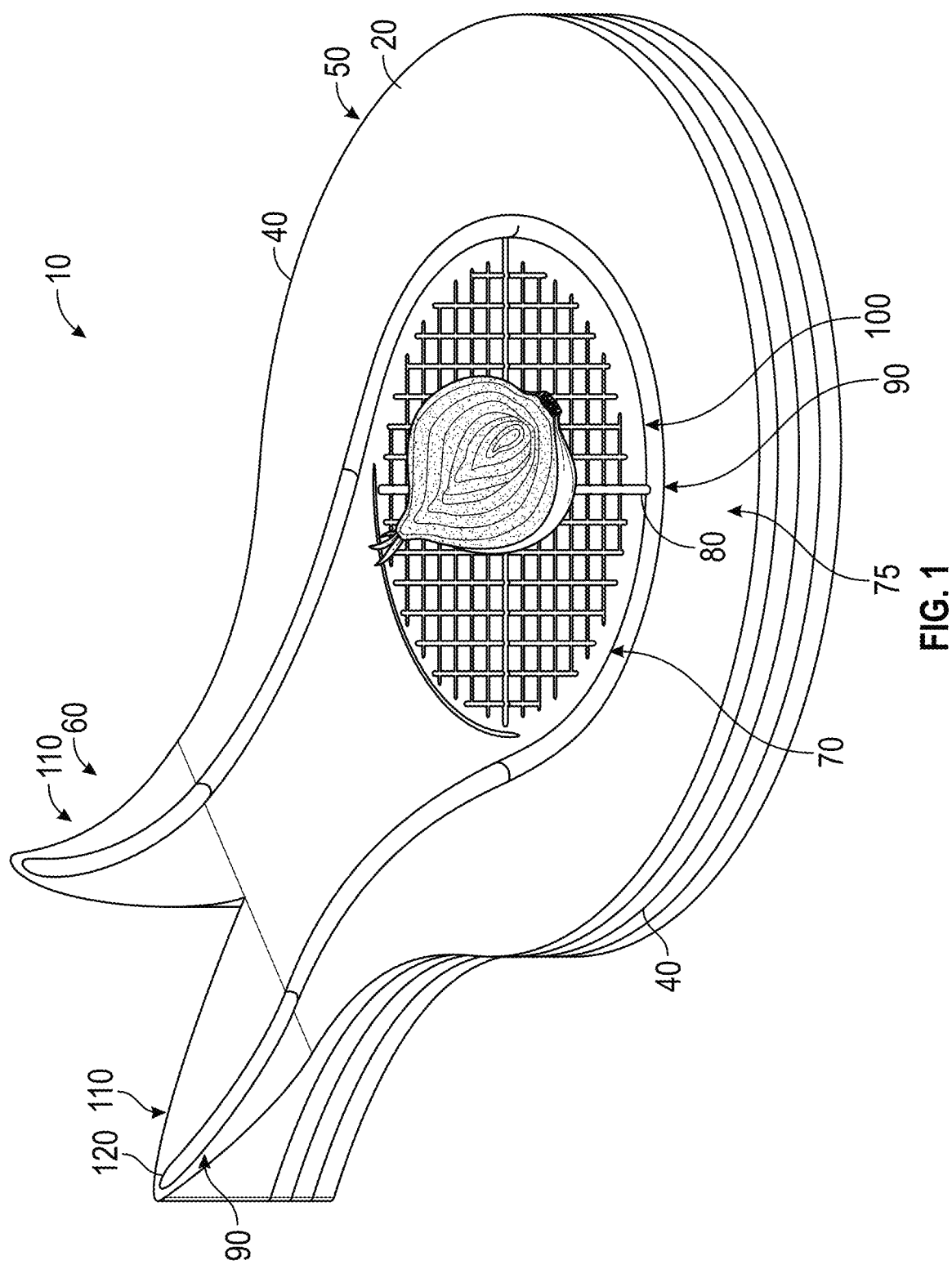
FIG. 1 illustrates a perspective view of a cutting board according to an implementation of the present disclosure.
Figure 2:
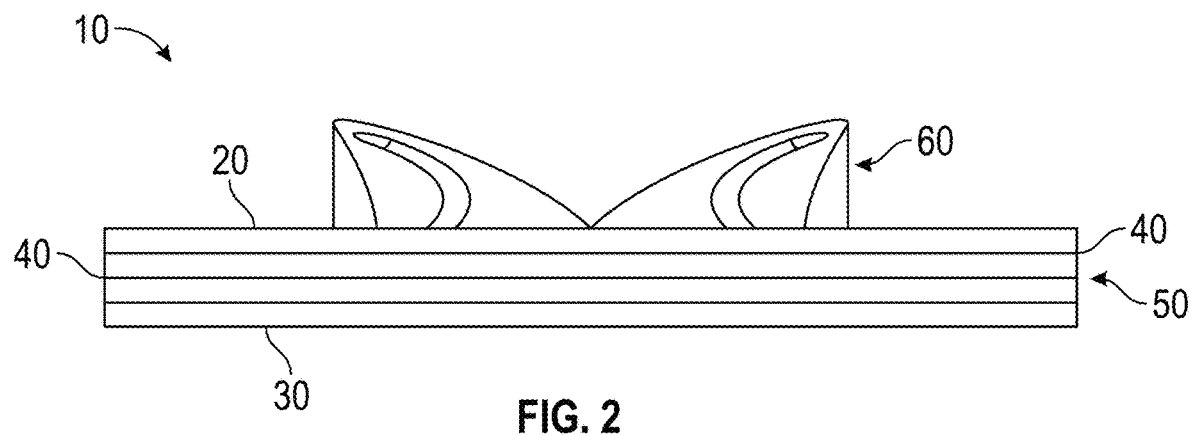
FIG. 2 illustrates a front elevational view of the cutting board of FIG. 1.
Figure 3:
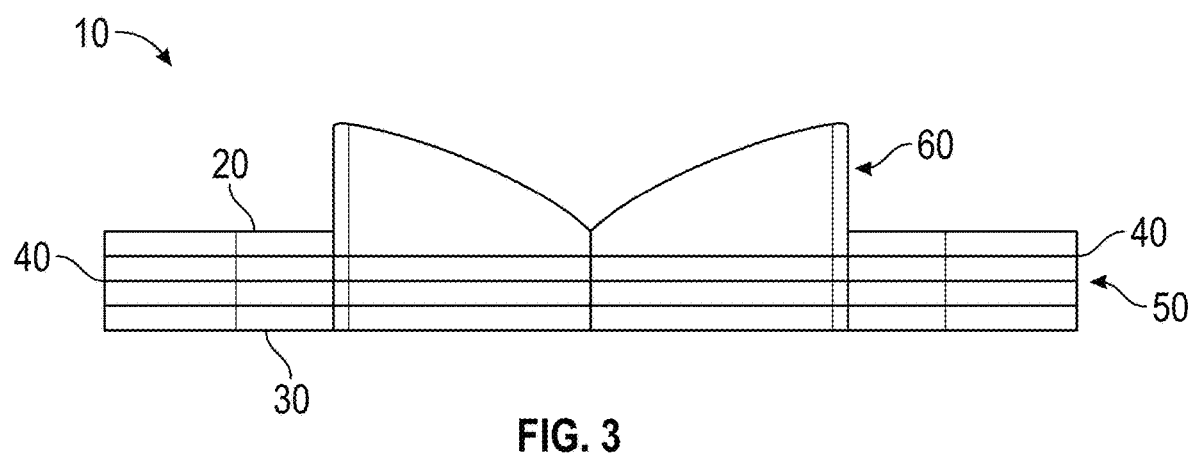
FIG. 3 illustrates a rear elevational view of the cutting board of FIG. 1.
Figure 6:
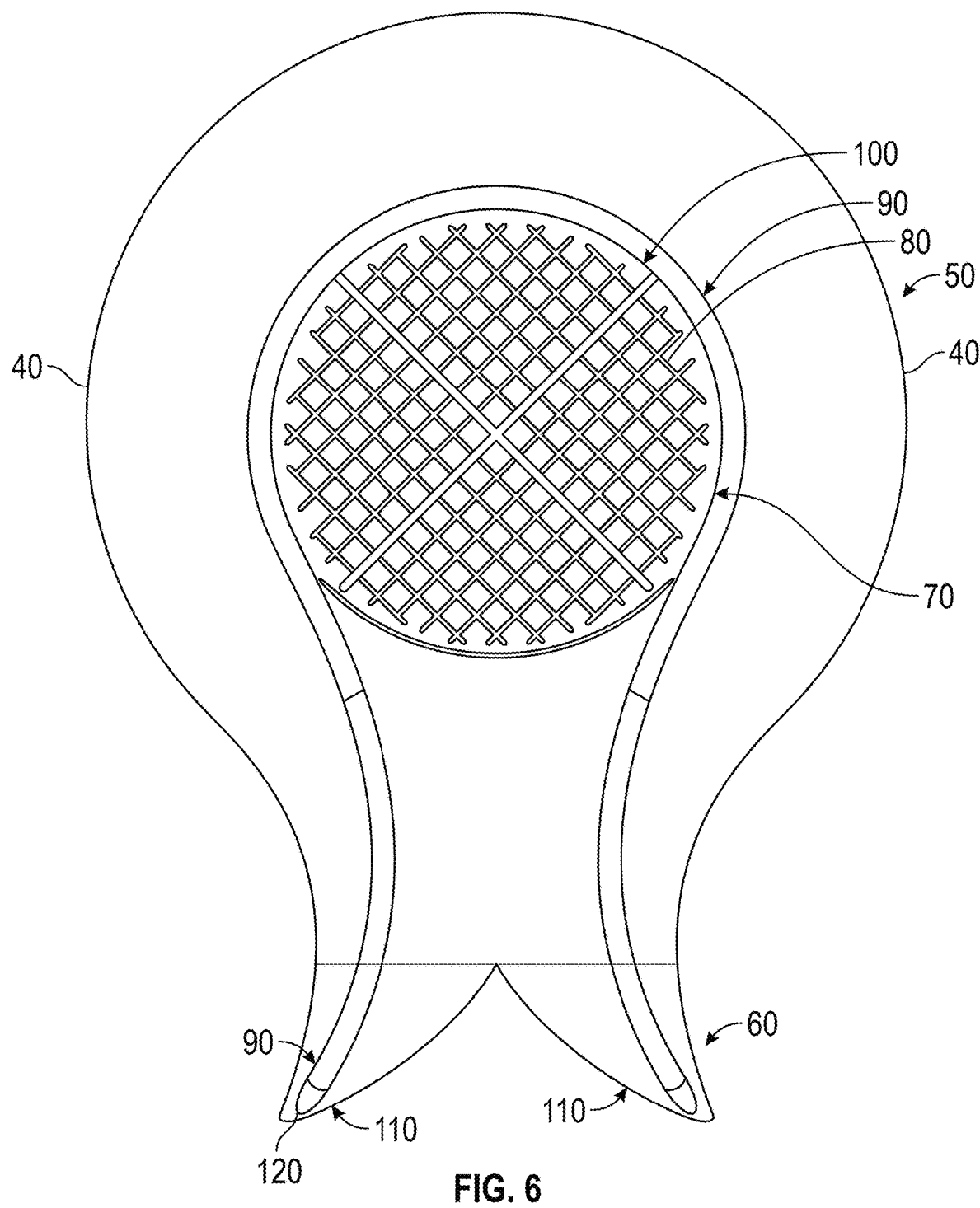
FIG. 6 illustrates a top plan view of the cutting board of FIG. 1.
Figure 7:
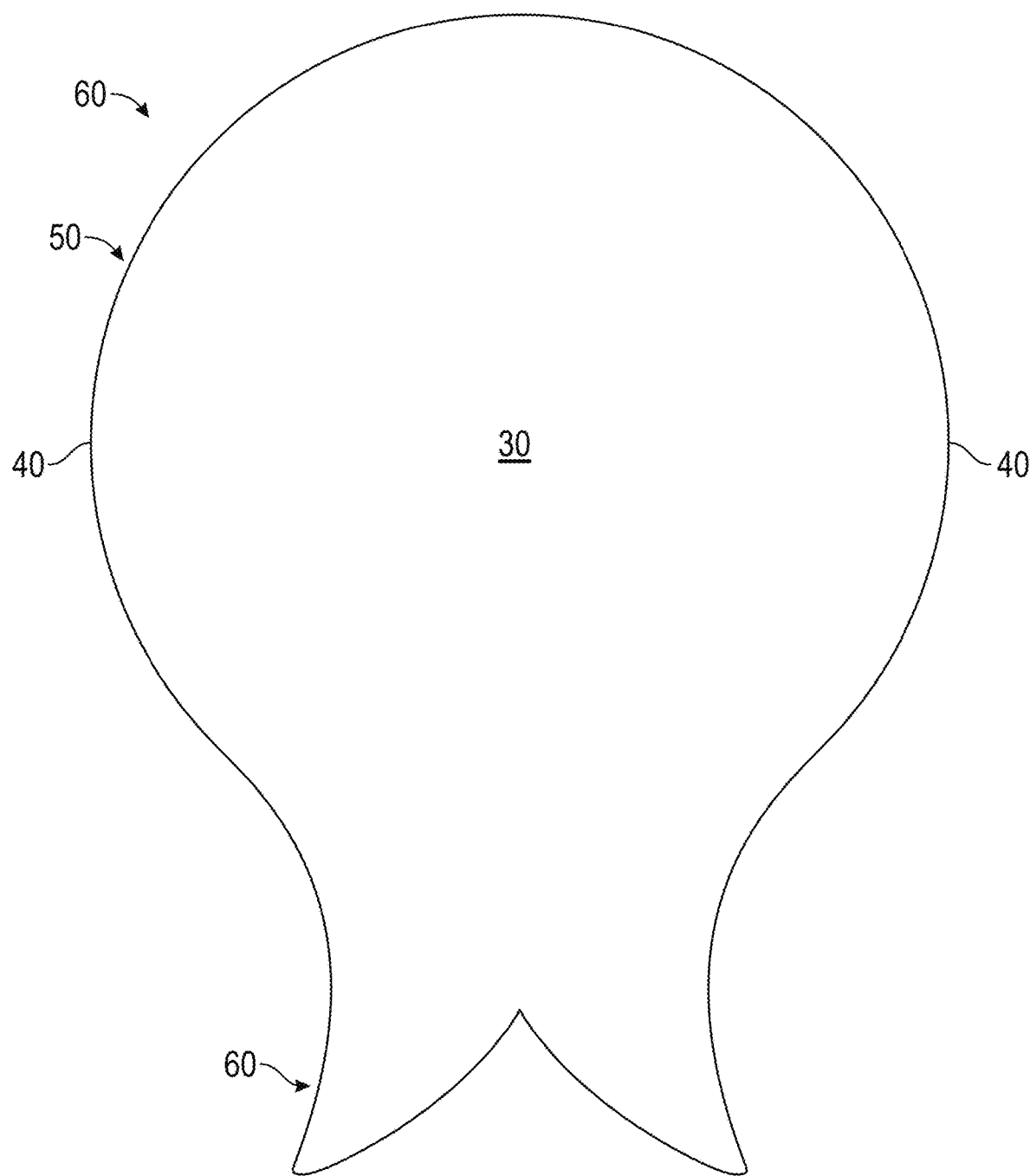
FIG. 7 illustrates a bottom plan view of the cutting board of FIG. 1.
Figure 8:
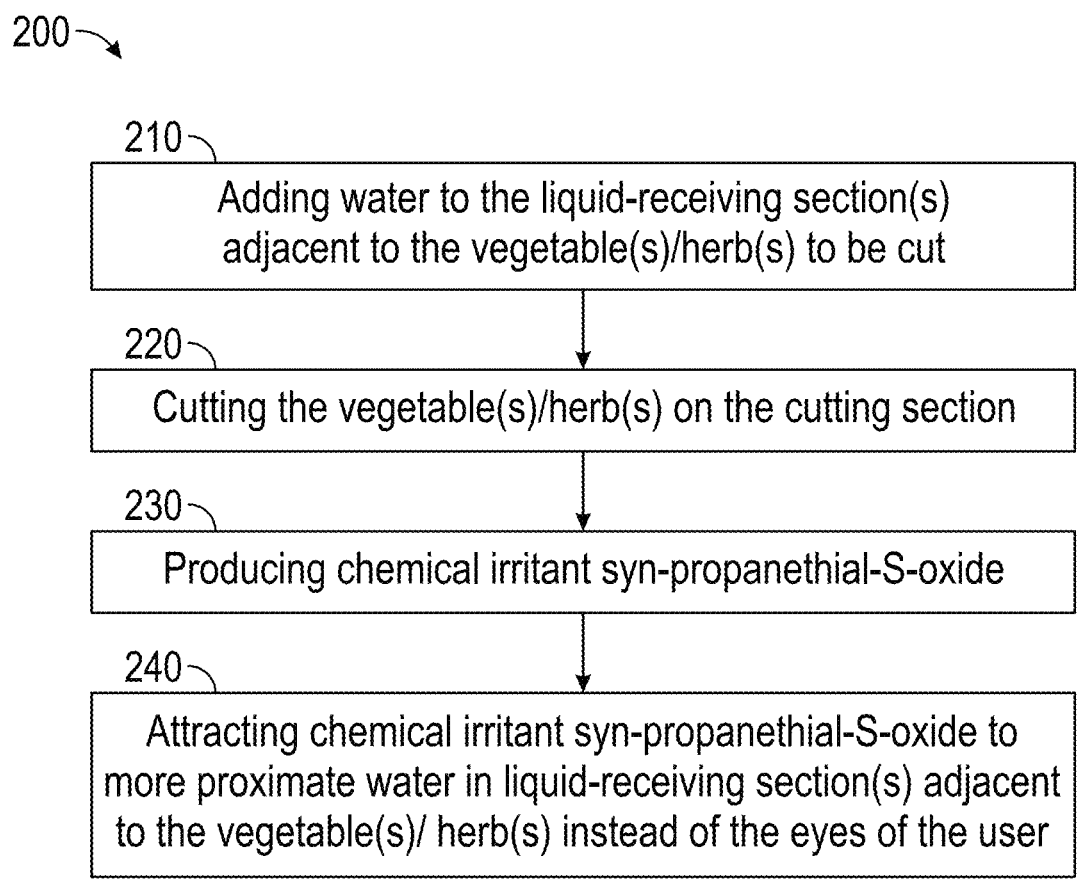
FIG. 8 is a flow chart of an exemplary method of using the cutting board of FIG. 1.

Reference will now be made to the figures to describe various aspects of example embodiments of the disclosure. FIG. 1 depicts a cutting board 10 for cutting vegetables (e.g., onions) and/or herbs that are members of the allium family that reduces eye irritation and tears during cutting. The cutting board 10 is in the shape of an onion and includes an upper surface 20, a bottom surface 30, opposite sides 40, a main section 50, and a top section 60.

The main section 50, which includes a shape corresponding to a body of an onion, includes a circular central cutting section 70 with adjacent liquid-receiving sections 75 such as central hatched grooves 80 and/or peripheral groove 90. Peripheral groove 90 is disposed along a periphery 100 of a substantial portion of the circular central cutting section 70. The central hatched grooves 80 and peripheral groove 90 both include sufficient depths so that fluid (e.g., water) in the central hatched grooves 80 communicates with the peripheral groove 90 and vice versa. The central hatched grooves 80 collect liquid of any sort from the cuttings and reduce spills in the kitchen.

The top section 60, which includes a shape corresponding to a stalk of an onion, includes split sections 110 angled upwardly from the main section 50 and includes terminating portions 120 of the peripheral groove 90.

The cutting board 10 made be made of a variety of one or more different materials such as, but not limited to, wood (e.g., bamboo) and include plies/sections 130. Bamboo is an ideal wood for the cutting board 10 because bamboo is non-toxic, lightweight, inexpensive, sustainable, and has low porosity.

The peripheral groove 90 is used to carry/hold water and the central hatched grooves 80 hold water (and juice from the cut onion(s)). The central hatched grooves 80 hold the onion(s) in place during cutting and allow for more uniform cut slices of onions. A curved/angled nature of the top section/onion stalk 60 helps to hold water in place, preventing water from dripping away while cutting, and allows for smoother transfer of cut onions to any dish and to drain the water and other liquids from the cutting board 10 after use. The cutting board 10 may be used for cutting other items in addition to vegetables/herbs.

A method 200 of using the cutting board 10 includes, at step 210, adding water to the cutting board 10 adjacent to the vegetable(s)/herb(s) to be cut (e.g., adding water to the peripheral groove 90, which may communicate the water to the central hatched grooves 80); at step 220, cutting the vegetable(s)/herb(s) of the allium family (e.g., onions) on the central cutting section 70 over the central hatched grooves 80; at step 230, producing chemical irritant syn-propanethial-S-oxide (e.g., when these vegetables/herbs are cut, the enzyme alliinase is released, causing a chemical reaction that results in the production of the chemical irritant known as syn-propanethial-S-oxide); and, at step 240, attracting chemical irritant syn-propanethial-S-oxide to more proximate water in the liquid-receiving section(s) 75 (e.g., peripheral groove 90 and/or central hatched grooves 80) adjacent to the vegetable(s)/herb(s) instead of more distal eyes of the user (e.g., the syn-propanethial-S-oxide, which is attracted to the closest liquid, is attracted to the water in the peripheral groove 90 and/or central hatched grooves 80 instead of the liquid in a user's eyes because the water in the peripheral groove 90 and/or central hatched grooves 80 is closer to the cut vegetable(s)/herb(s) than the user's eyes are to the cut vegetable(s)/herb(s). resulting in the cutting board 10 reducing eye irritation and tears during cutting of these types of vegetables/herbs).

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

I claim:

1. A cutting board that reduces eye irritation and tears during cutting of a vegetable and/or a herb of the allium family, comprising:
   a main section including a cutting section configured to receive the vegetable and/or the herb of the allium family to be cut;
   a top section curved upwardly from the main section and including one or more liquid-receiving sections adjacent to the cutting section, the one or more liquid-receiving sections include a closed terminating portion that terminates proximal to an end of the top section to retain liquid;
   wherein a chemical irritant syn-propanethial-S-oxide produced when cutting the vegetable and/or the herb of the allium family is attracted to more proximate liquid in the one or more liquid-receiving sections instead of more distal eyes of the user, resulting in the cutting board reducing eye irritation and tears during cutting of the vegetable and/or the herb of the allium family.

2. The cutting board of claim 1, wherein the cutting board has a shape of a body of an onion in a top plan view.

3. The cutting board of claim 1, wherein the cutting section is a central cutting section and the one or more liquid-receiving sections include a liquid-receiving groove adjacent to the central cutting section.

4. The cutting board of claim 3, wherein the one or more liquid-receiving sections include central intersecting grooves in the central cutting section.

5. The cutting board of claim 3, wherein the central cutting section includes a perimeter and the liquid-receiving groove is a peripheral groove adjacent to the perimeter of the central cutting section.

6. The cutting board of claim 1, wherein the top section includes split sections spaced by a gap.

7. The cutting board of claim 6, wherein the split sections each include the one or more liquid-receiving sections with the closed terminating portion.

8. The cutting board of claim 1, wherein the cutting board is made of bamboo.

9. A method of using a cutting board that reduces eye irritation and tears during cutting of a vegetable and/or a herb of the allium family, the cutting board comprising a main section including a cutting section configured to receive the vegetable and/or the herb of the allium family to be cut, and one or more liquid-receiving sections adjacent to the cutting section, the method comprising:

adding water to the one or more liquid-receiving sections of the cutting board adjacent to the vegetable and/or the herb of the allium family to be cut;

cutting the vegetable and/or the herb of the allium on the cutting section of the cutting board whereby the chemical irritant syn-propanethial-S-oxide is produced by the vegetable and/or the herb of the allium during cutting;

attracting the chemical irritant syn-propanethial-S-oxide to the more proximate liquid in the one or more liquid-receiving sections instead of more distal eyes of the user, resulting in the cutting board reducing eye irritation and tears during cutting of the vegetable and/or the herb of the allium family.

10. The method of claim 9, wherein the cutting section is a central cutting section and the one or more liquid-receiving sections include a liquid-receiving groove adjacent to the central cutting section, and adding water includes adding water to the liquid-receiving groove.

11. The method of claim 10, wherein the central cutting section includes central intersecting grooves and cutting includes cutting on the central cutting section over the central intersecting grooves.

12. The method of claim 11, further including communicating water between the liquid-receiving groove and the central intersecting grooves.

13. The method of claim 10, wherein the central cutting section includes a perimeter, the liquid-receiving groove is a peripheral groove adjacent to the perimeter of the central cutting section, and adding water includes adding water to the peripheral groove.

14. The method of claim 9, wherein the cutting board has a shape of a body of an onion in a top plan view.

15. The method of claim 9, wherein the cutting board includes a top section with the one or more liquid-receiving sections.

16. The method of claim 15, wherein the top section is angled upwardly from the main section.

17. The method of claim 16, wherein the top section includes split sections spaced by a gap and each of the split sections include the one or more liquid-receiving sections.

18. The method of claim 9, wherein the cutting board is made of bamboo.

19. The method of claim 9, wherein the one or more liquid-receiving sections include a closed terminating portion that terminates proximal to an end of a top section to retain liquid.

\* \* \* \* \*